United States Patent Office 3,449,283
Patented June 10, 1969

3,449,283
PROCESS FOR THE PREPARATION OF OIL-EXTENDED RUBBERY POLYMERS
Jozef J. T. M. Geerards, Beek, and Bert H. L. M. Wijler, Geleen, Netherlands, assignors to Stamicarbon N.V., Heerlen, Netherlands
No Drawing. Filed Feb. 23, 1966, Ser. No. 529,233
Claims priority, application Netherlands, Feb. 23, 1965, 6502224
Int. Cl. C08f 45/28, 29/02
U.S. Cl. 260—29.6
14 Claims

ABSTRACT OF THE DISCLOSURE

The present disclosure relates to the blending of rubbery olefin polymers with oil extenders. The rubber, in solid state, and containing at least 0.5% water and most preferably between 7 and 20% by weight water is mixed with the oil extenders in a suitable mixer, preferably an extruder. While in the absence of water the solid rubbery polymer will not absorb the oil, with the water present such absorption may be carried out. The mixing temperature is preferably maintained below 150° C. and during such mixing the water is driven off.

---

The present invention relates to a process for the preparation of oil extended rubbery polymers and more particularly to a process which includes distributing oil through a polymer derived from at least one mono-olefine and, if desired, to a maximum of 20 mol percent of one or more poly-unsaturated compounds.

The rubbery polymers used may be polymers which possibly contain a halogen and are derived from one mono-olefine, e.g. butylene-2, pentene-1 and isobutylene, or copolymers derived from two or more mono-olefines, e.g. ethylene, propylene, butylene-1, pentene-1, hexene-1 and/or heptene-1, including the branched or non-branched isomers thereof, e.g. 4-methylpentene-1. Particularly suitable polymers are the stereo-block polymers, hetero-block copolymers and statistical polymers which are derived from ethylene and propylene and possibly butylene-1, and which are practically completely saturated. It is also possible to use the unsaturated polymers which are derived from at least one mono-olefine and, to a maximum of 20 mol percent, from one or more poly-unsaturated compounds, for instance butadiene, isoprene and chloroprene, in particular the non-conjugated poly-unsaturated monomers, e.g. 2-methylene norbornene, dicyclopentadiene, hexadiene 1-4 and cyclo-octadiene 1-5. By preference, use is made of the copolymers derived from ethylene, propylene, dicyclopentadiene and possibly 4-methylpentene-1. These rubbery polymers are usually obtained as a solution thereof in a liquid solvent, polymerised therein with the aid of coordination catalysts.

The term coordination catalysts refers to a catalyst obtained by combining at least one compound of a metal belonging to any of the sub-groups of the groups 4, 5, 6 or to group 8 of Mendelejeff's Periodic System, including thorium and uranium, with a metal, alloy, metal hydride or, preferably, an organo-metallic compound of a metal belonging to the groups 1, 2, 3, or to the 4th main group of the said periodic system. The polymerization may be effected in the presence of substances containing free electron pairs, for instance oxygen, water or alcohol. The molecular weight of the polymer is usually controlled by the addition of chain-transfer agents, e.g. hydrogen.

The dispersing agent which may be used in the polymerization of the monomers may be any liquid or liquefied gas that is inert with respect to the catalyst, such as saturated aliphatic or cycloaliphatic hydrocarbons, for example propane, butane, pentane, hexane, heptane, or other petroleum fractions, cyclohexane, isopropylcyclohexane; aromatic hydrocarbons, for example benzene, toluene or xylene, or halogenated aliphatic, cyclo-aliphatic or aromatic hydrocarbons for example tetrachloroethylene and methyl chloride. In addition to, or instead of these hydrocarbons, one or more of the monomers themselves in the liquid state, in particular propylene, may be used as dispersing agents.

Suitable oils to be used in the present process are the well known, commercially available "rubber-extended oils," which as a rule substantially consist of aromatic paraffinic or naphthenic hydrocarbon mineral oils. It is also possible to use mixtures of such oils. By preference, types of oil of a predominantly naphthenic nature, for example circosol 2 XH, are used in the process according to the invention, because in general the properties of the products obtained by combination of these oils with the rubbery polymer are better.

The extender oil may be a mixture of mono- and dialkyl-benzenes having higher alkyl groups available under the trade name "Product SN" and being the distillation residue of the alkylation of benzene. A suitably aliphatic extender oil is available under the trade name "Dutrex SPX 334." Both "Product SN" and "Dutrex SPX 334" refer to distillation fractions produced by the petrochemical industry which are comonly used in the rubber industry. They are mixtures of hydrocarbons having the following characteristics:

|  | Dutrex SPX 334 | Product SN |
|---|---|---|
| Viscosity | 4.72 cst./98.9° C | 4.42 cst. |
| Density | 0.8792 | 0.8789. |
| Viscosity-density constant | 0.814 | 0.805. |
| Flash point | 230° C | 175° C. |
| Solidifying point | −70° C | −37° C. |
| Molecular weight | 440 | 333–337. |
| Content of basic nitrogen compounds calculated as $N_2$ | 0% | 0.1%. |
| Sulfur content | 0.08% | 11 mg./kg. |
| $n_D^{20}$ °C | 1.4822 | 1.4938. |

The following extender oils are examples of other oils which may also be used:

Necton 60, phenol extract of a naphthenic distillate; Nuso 125, a phenol extract of a coastal crude distillate; 500 distillate, distillate of a coastal crude; Barnhardt motor oil distillate, motor oil distillate fraction from a Texas crude; Roxtone 180, distillate of a heavy naphthenic Colombian crude; Barosa 43XT, phenol extract from a mixed base of Gulf Coast crude; C–22 Aromatic Oil, the aromatic oil fraction from thermal cracking of the heavy ends obtained by catalytic cracking of virgin gas oil from Texas crude; Process Oil #1, phenol extract of a motor oil distillate from a Texas crude; Sun Process Oil #551; SPX 97, commercial oil obtained from the Shell Oil Company; Barosa X56, a phenol extract from a mixed base Gulf Coast crude having a higher viscosity than Barosa 43XT, Diol 80, an acid-treated naphthenic distillate; Colombian distillate, distillate from a Colombian crude; Colombian raffinate, raffinate from phenol extraction of Colombian distillate.

It is a well-known fact that the processability of rubbery polymers such as ethylene-propylene copolymers can be increased by distributing oil through the polymers. It is furthermore known that vulcanization of such polymers yields products whose properties are superior to those of the product obtained by vulcanization of a polymer with the same Mooney viscosity which has not been blended with oil. Replacement of part of the relatively expensive polymer by oil will also result in a considerable lowering of the cost price. The polymers to be blended with oil generally possess a Mooney viscosity of at least 40, as otherwise the mechanical properties of the polymers after blending will be unsatisfactory.

It is, however, very difficult to distribute oil through the rubbery polymer isolated from the polymerization mixture, because unlike other rubbery polymers, the above-defined polymers, in particular those having a Mooney viscosity above 100, possess only a very small oil-absorbing power.

It has already been proposed to add the oil to a solution of the rubbery polymer obtained in the polymerization (see German Auslegeschrift 1,175,875).

Although the oil can be added to the solution without difficulty (see U.S. Patent 2,899,401, column 2, lines 9–12), there is the drawback that the equipment for processing the polymer, including the evaporator, must be sufficiently large to cope with the increase in volume of the solution due to the addition of the oil thereto. Another drawback is that, due to the emulsifying effect of the oil, it is difficult to achieve a separation between the polymer solution and an aqueous phase, which is required for removal of catalyst components from the polymer solution. Still another drawback is that if owing to irregularities occurring during polymerization, a polymer with a varying Mooney viscosity is obtained, it will be impossible immediately to add the correct amount of oil—which depends on the Mooney viscosity of the polymer—to the polymer solution, since the Mooney viscosity is determined on isolated, dry polymer. It is therefore not a simple matter to obtain an end product of constant quality.

Surprisingly, it has now been found that the oil-absorbing power of the rubbery polymer is increased to a very high degree when the polymer is treated to contain at least 0.5% by weight of water, so that the oil can be easily distributed through the polymer. This discovery is the more surprising as it was not to be expected that water, which is immiscible with the oil, would raise the oil-absorbing power of the polymer.

The process according to the invention for the preparation of oil extended rubbery polymers by distributing oil through a polymer which is derived from at least one mono-olefine and, if desired, combined with up to 20 mol percent, of one or more poly-unsaturated compounds, is characterized in that the polymer contains at least 0.5% by weight of water during the distribution of the oil.

The abovementioned phenomenon is difficult to explain. Possibly, it is caused by the formation of an oil-water emulsion capable of penetrating deeply into the water-containing polymer, the water serving as a vehicle for the oil and thus homogeneously distributing the oil through the polymer.

The polymer is recovered from the polymerization mixture in a customary way, e.g. by evaporating the dispersing agent by distillation or steam distillation, preceded if desired by deactivation of the catalyst used, such as by alcohol washing and by removal of the catalyst components, such as by washing the polymerization mixture with water.

Preferably, the water content of the rubbery polymer should be at least 4% by weight, since the oil can be distributed therein more rapidly and easily if a larger amount of water is present. A water content between 7 and 20% by weight is particularly preferred, because a polymer having such a water content can be readily obtained by the customary methods of processing the polymer-containing polymerization mixture, such as by pressing out polymer crumbs obtained by contacting the polymerization mixture in the form of a solution, with water at an elevated temperature.

The presence of amounts of water of more than 60% by weight is in general not to be recommended, because of the danger of corrosion of the mixer used and the uneconomical method of removal of the water present from the product, viz by evaporation.

To ensure that the oil will be properly and readily distributed through the polymer, it is desirable that the water be distributed through the crumb as homogeneously as possible. This can be accomplished, for instance, by evaporating the polymerization mixture in the presence of an aqueous phase at elevated temperature.

The oil can be distributed through the water containing polymer in various ways, e.g. with the aid of an open roller mill, or in a Banbury mixer. Preferably, the distribution of oil is effected in a continuous mixer, e.g. a screw extruder or other extruder.

The total amount of oil may be added to the rubbery polymer at one time, but it is advisable to add it gradually, for example in batches. If use is made of a continuous mixer, it may be desirable to supply the oil to the mixer at various points. Some oil may, if desired, also be added to the polymer in a previous stage, e.g. during the polymerization of the monomers.

The amount of oil distributed through the polymer according to the polymer, depends on the properties of the rubbery polymer used and on the desired properties of the end product, for example, from about 20 to 100% by weight of oil can easily be added to the polymer and homogeneously distributed therethrough, although larger amounts of oil may be used, if desired.

The oil to be used may be at room temperature, but, if desired, it can also be at higher temperatures, e.g. at 80, 110, 130, 150° C. or over.

During mixing, the temperature of the rubbery polymer may be varied within wide limits, e.g. between 10 and 200° C. As a rule, no heat is supplied or carried off, so that the temperature of the polymer will increase during mixing on account of the fact that the mechanical energy of the mixer is transformed into heat. Owing to the evolution of heat during mixing, the temperature of the polymer usually increases to about 150° C., as a result of which the water present will gradually evaporate. In general, it is not desirable that this temperature considerably exceed 150° C., because in that case there is a chance that the properties of the polymer will become less satisfactory due to the polymer being oxidized by air. An additional advantage of the process according to the invention is that, because of the distribution of oil through the polymer, a product with a lower water content is obtained. If desired, mixing may be continued until practically all of the water has been expelled from the product. This offers the advantage that in one and the same device the oil can rapidly and without difficulty be distributed through the oil, and at the same time a virtually water-free product can be obtained.

If desired, rubber additives which are conventionally incorporated in rubbery polymers such as zinc oxide, stearic acid, anti-oxidants, U.V.-stabilizers, organic accelerators such as tetramethylthiuram disulphide and 2-mercaptobenzthiazole, so-called tackifiers, and dyes, may be added to the rubbery polymer during the distribution of the oil. If desired, at least some of such additives, e.g. the oil-soluble additives, may be added to the oil before incorporation in the water-containing polymer. It is also possible to add fillers such as chalk and kaolin, reinforcing fillers such as colloidal silica, calcium, silicates, and furnace blacks such as "HAF," "ISAF," "FEF" and "SRF," wholly or partly to the oil before distributing it through the polymer.

If desired, the product issuing from the mixer may be formed into a sheet or as a strand or bale.

Oil extended vulcanizable unsaturated polymers obtained by the process of the invention may be vulcanized in a very simple way by heating them with sulphur to 100–250° C., and preferably to 140–170° C. Use may also be made of the recipes customary for the vulcanization of butyl rubber. Free radical sources, such as peroxides, may be added, if desired.

The vulcanized polymers are eminently suited for being used in the manufacture of car tires, conveyor belts and floor tiles.

The following examples serve to elucidate the invention, without, however, restricting its scope. The Mooney viscosity is determined according to ASTM D 927.

COMPARATIVE EXAMPLE

In a Banbury mixer 2.0 kg. of a substantially naphthenic oil of the trademark "Circosol 2XH" (obtained from the Sun Oil Company) was added to 4.5 kg. of a polymer which was derived from 56% by weight of ethylene and 44% by weight of propylene contained 0.1% by weight of water and had a Mooney viscosity of 110. After 120 minutes, during which time the kneader rotated at 100 revolutions per minute, hardly any oil had been taken up by the rubbery polymer.

Example 1

The procedure described in the comparative example was repeated, with the difference that use was made of a polymer containing about 10% by weight of water, calculated with respect to the dry polymer and having a Mooney viscosity of 160. The oil was added to the polymer in two portions, viz. one half of it immediately at the start of the mixing treatment and the second half when the temperature of the polymer was about 95° C. After a total mixing time of 6 minutes, during which the temperature rose to 140–150° C., the oil had been homogeneously distributed through the polymer, as determined by analyses of samples of this polymer.

The resulting product contained 0.1% by weight of water, calculated with respect to the polymer, and had a Mooney viscosity of 60.

Example 2

The procedure described in Example 1 was repeated, with the difference that the polymer used was derived from 50% by weight of ethylene, 45% by weight of propylene and 5% by weight of dicyclopentadiene, contained 15% by weight of water and had a Mooney viscosity of 110. After only 5 minutes, an amount of 1 kg. of the oil had been homogeneously distributed through the polymer. The Mooney viscosity of the end product was 60.

What is claimed is:

1. A process for the preparation of oil extended rubbery polymers which comprises adding an extender oil to a rubbery polymer in solid state having a content of water of at least 0.5% by weight, the water being distributed throughout said solid state polymer, and mixing said ingredients until the oil has been distributed throughout said polymer, said polymer being selected from the group consisting of a homopolymer derived from one mono-olefin, a copolymer derived from at least two mono-olefins, a copolymer derived from at least one mono-olefin combined with up to 20 mol percent of at least one conjugated poly-unsaturated compound and a copolymer derived from at least one mono-olefin combined with up to 20 mol percent of at least one non-conjugated poly-unsatursated compound.

2. A process according to claim 1 wherein the polymer contains 4–60% by weight of water.

3. A process according to claim 1 wherein the polymer contains 7–20% by weight of water.

4. A process according to claim 1 wherein 20–100% by weight of oil calculated with respect to the dry polymer is added to the polymer.

5. A process according to claim 1 wherein rubber additives are added to the oil before it is distributed through the polymer.

6. A process according to claim 5 wherein a reinforcing filler is added to the oil.

7. A process according to claim 6 wherein carbon black is used as the reinforcing filler.

8. A process according to claim 1 wherein the product obtained is vulcanized with the use of sulphur.

9. The product obtained by the process of claim 1.

10. The product obtained by the process of claim 8.

11. A method in accordance with claim 1 wherein said rubbery polymer treated is isolated from the polymerization medium.

12. A method in accordance with claim 1 wherein said mixing is carried out in an extruder.

13. A method in accordance with claim 1 wherein the total amount of oil added to the rubbery polymer is added gradually in batches.

14. A method in accordance with claim 1 wherein the temperature during mixing of said polymer and oil is maintained below about 150° C.

References Cited

UNITED STATES PATENTS

| | | | |
|---|---|---|---|
| 2,963,388 | 12/1960 | Landouar. | |
| 3,235,527 | 2/1966 | Sparks | 260—29.7 |
| 3,236,799 | 2/1966 | Bourque et al. | 260—29.7 |
| 3,305,508 | 2/1967 | La Haij et al. | 260—29.7 |

MURRAY TILLMAN, *Primary Examiner.*

H. ROBERTS, *Assistant Examiner.*

U.S. Cl. X.R.

260—29.7, 33.6